United States Patent Office 2,758,547
Patented Aug. 14, 1956

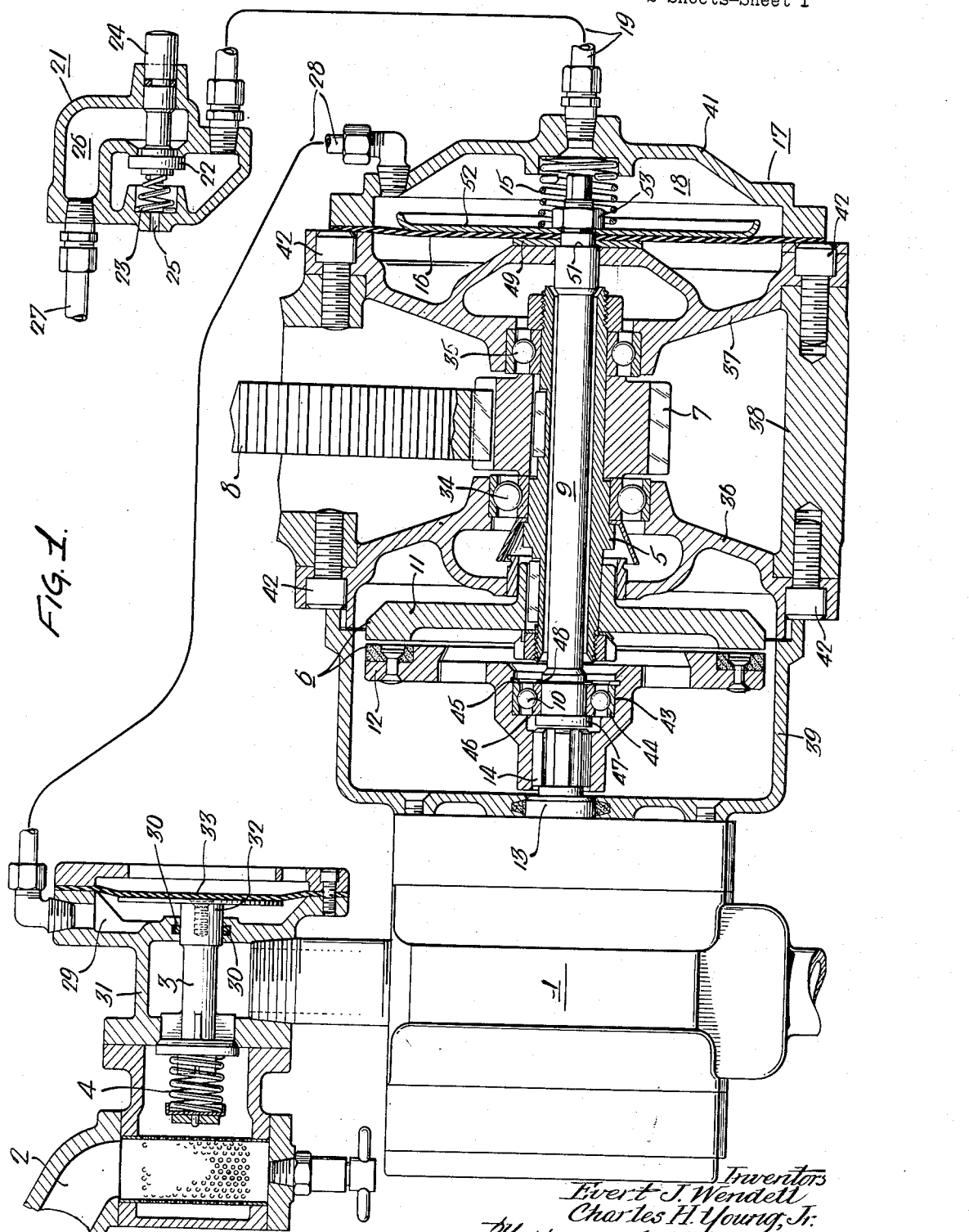

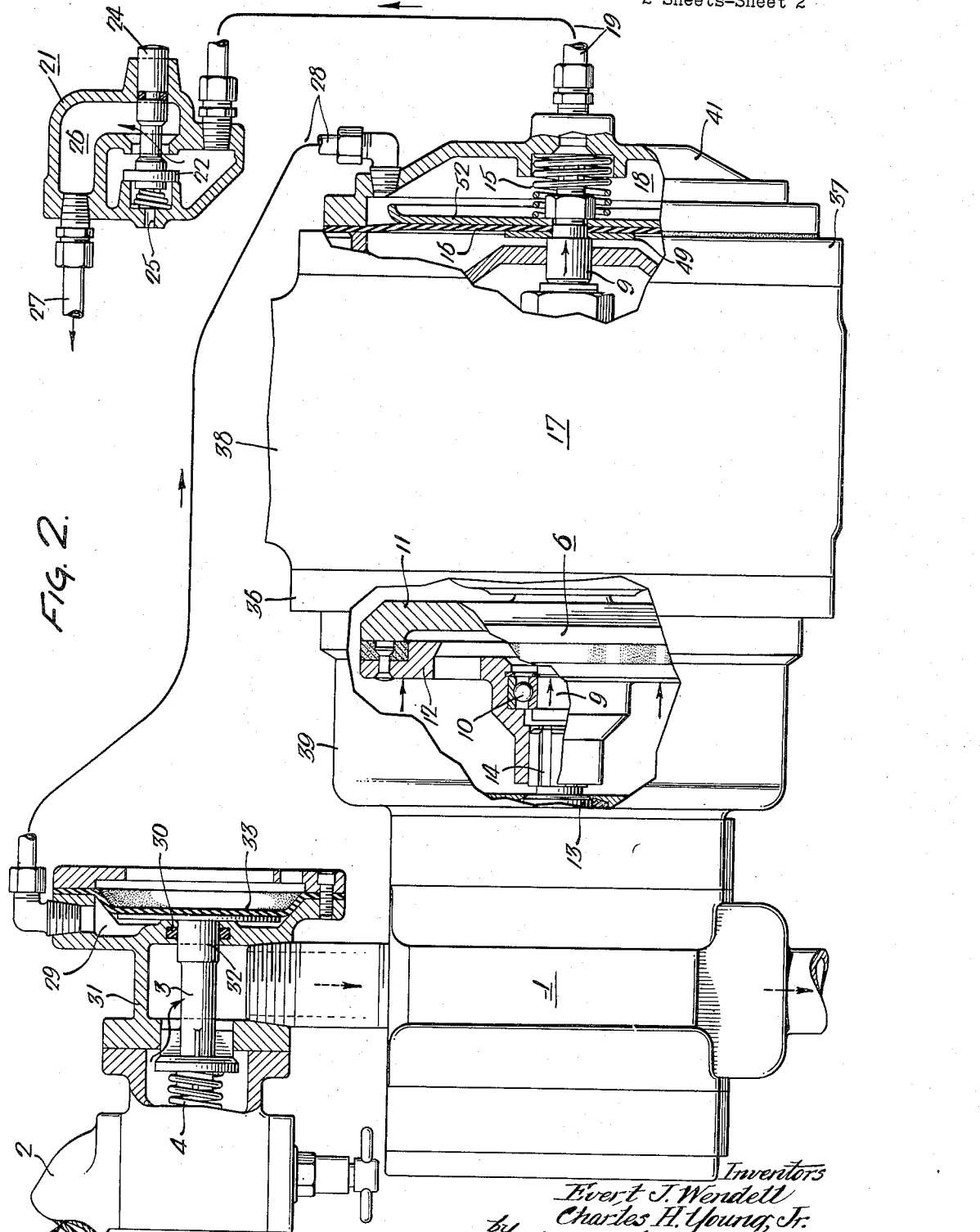

2,758,547

PRIMING MECHANISM FOR CENTRIFUGAL PUMPS

Evert J. Wendell and Charles H. Young, Jr., Wayne, Pa., assignors to Hale Fire Pump Company, Conshohocken, Pa., a corporation of Pennsylvania Application August 4, 1955, Serial No. 526,455

3 Claims. (Cl. 103—113)

This invention relates to priming systems for centrifugal pumps and the object of the invention is to provide a generally improved priming mechanism, relatively simple in form of economical construction and readily accessible for inspection and servicing, and positive in operation.

The invention will be more readily understood by reference to the attached drawings, wherein:

Fig. 1 is a sectional diagrammatic view showing in assembly the essential elements of mechanism employed by the system, and Fig. 2 is a corresponding view showing the elements in their respective priming positions.

The system comprises a suitable priming pump 1, the intake of which is connected, by way in the present instance of duct 2, with the suction of the main centrifugal pump (not shown) in conventional manner. The duct 2 is controlled by a valve 3 which is normally seated, as shown in Fig. 1, by action of a spring 4. The priming pump is driven from a hollow shaft 5 and through a friction clutch 6, the shaft 5 carrying a gear 7 which is connected, through a gear 8 in the present instance, with the drive of the main pump. The shaft 5 runs continuously when the main pump is in operation.

The clutch 6 comprises an axially fixed element 11 attached to the shaft 5, and an axially movable complementary element 12 which has a splined connection with the shaft 13 of the priming pump, as indicated at 14, and which is attached through a bearing 10 to one end of a shaft 9, this shaft being axially movable within the shaft 5. The shaft 9 and the clutch element 12 normally assume the positions shown in Fig. 1 wherein the clutch is released; and when the shaft 9 is moved to the right as viewed in the drawings, the clutch element 12 is brought into engagement with the element 11 to establish a driving connection between the gear 8 and priming pump actuating the latter. The shaft 9 is normally retained in the clutch-release position by action of a spring 15 which engages the opposite end of the shaft from the clutch 6.

The shaft 9 is moved axially to engage the clutch 6 by means of a flexible diaphragm 16. The diaphragm 16 is mounted in the housing 17 so that it forms one wall of a chamber 18 in the latter. In the present instance, the chamber 18 is connected through a duct 19, with a valve casing 21. The casing 21 contains a valve element 22 which is normally held to its seat by a spring 23 but which may be forced from its seat against the pressure of the spring by manual pressure on a push button 24. When the valve element 22 is seated, as illustrated in Fig. 1, the duct 19, and therefore the chamber 18, is connected to the atmosphere through a vent 25 in the casing wall; and when the valve element 22 is unseated by pressure on the button 24, the element acts to seal off the vent 25, as illustrated in Fig 2. When the valve element is thus unseated the pipe 19 is connected with a chamber 26 in the casing 21 and through this chamber and a communicating duct 27 with the intake manifold of the internal combustion engine (not shown) which drives the main pump. When the engine is in operation, therefore, and the valve 22 is unseated, the pipe 19 and chamber 18 will have suction applied thereto from the intake manifold of the engine. The opposite side of the diaphragm 16 is connected through the interior of the housing 17 with atmospheric pressure, so that when suction is applied to the chamber 18 as described, the diaphragm 16 will be forced to the right, as viewed in the drawings, to the position illustrated in Fig. 2. This movement of the diaphragm draws the shaft 9 to the right against the pressure of the spring 15 and carries the clutch element 12 into engagement with the clutch element 11. The priming pump 1 is then operatively connected with the drive of the main pump.

The chamber 18 is connected by a pipe 28 with a chamber 29 in the casing 31 of the valve 3. The stem 32 of the valve element 3 passes through the wall of the chamber 29 and is attached to a diaphragm 33 which in effect forms the outer wall of the chamber 29. Suitable packing means 30 seals the opening in the wall of the chamber 29 through which the valve stem 32 extends. The opposite side of the diaphragm 3 is exposed to atmospheric pressure. When, therefore, the chamber 18 is evacuated as described above, the chamber 29 will also be evacuated as a result of which the diaphragm 33 will be forced to the left into the position shown in Fig. 2. This movement of the diaphragm unseats the valve 3 against the pressure of the spring 4, also as shown in Fig. 2, and establishes connection between the suction side of the main pump and the intake of the priming pump 1.

The housing 17 for the clutch assembly, including the shafts 5 and 9 and the diaphragm actuator 16, also provides support, in the present instance, for the priming pump 1. The hollow shaft 5 is journalled in anti-friction bearings 34 and 35 which are mounted respectively in two annular members 36 and 37 the outer peripheries of which are secured between a central housing member 38 and the two end sections 39 and 41. The pump 1 is attached to the end section 39; and the end section 41 forms the outer wall of the suction chamber 18. Cap screws 42 attach the end sections 36 and 37 of the housing to the center section or member 38; and the end sections 39 and 41 are attached by similar means (not shown) to the peripheral portions of the member. The section 41 also clamps the periphery of the diaphragm 16. The mode of assembly affords ready access both to the clutch and the diaphragm for inspection and servicing.

The anti-friction bearing 10 is mounted in a countersunk recess 43 in the clutch member 12. The outer race ring 44 is secured in the recess by a snap ring 45. The inner race ring 46 abuts a terminal flange 47 on the shaft 9, and is secured in place on the shaft by a snap ring 48. The diaphragm 16 is clamped between a washer 49, which seats against a shoulder 51 on the shaft 9, and a disc 52 of relatively large radius, the clamp being effected through the medium of a nut 53 threaded on the shaft against the outer face of the disc. The spring 15 is confined between the disc 52 and the housing end section 41. The assembly, by use of the hollow shaft and the relative positions of the clutch and diaphragm elements, is highly compact, rugged and efficient.

As previously set forth, the several elements of this system normally occupy the positions in which they are shown in Fig. 1. When the main centrifugal pump is put into operation, the shaft 5 is rotated through the gears 7 and 8 as described. If now the button 24 is pressed inwardly to the position shown in Fig. 2, the diaphragm 16 is forced by atmospheric pressure to the right, drawing the shaft 9 also to the right and engaging the clutch 6. The priming pump 1 is thereby put into operation. At the same time, the diaphragm 33 of valve 3 is moved to the left to the position shown in Fig. 2, thereby unseating the valve 3 and connecting the priming pump with the main pump. The button 24 is held down until the priming operation, which proceeds in conventional manner, is completed after which release of the button will have the effect of disengaging the clutch 6, interrupting the operation of the priming pump and closing the valve 3. It is believed that the details of the operation of the device will be apparent from the foregoing description.

We claim:

1. In a priming device for centrifugal pumps and in combination with driving means for said pump, a priming pump, means including a valve for connecting the priming pump to the suction of the centrifugal pump for priming the latter and means acting to normally close said valve, a diaphragm actuator for opening said valve, means for operatively connecting the priming pump to said driving means for actuating the pump, said means including a hollow shaft connected to the driving means, a clutch element secured to said shaft, a second shaft movable axially within said hollow shaft, a complementary clutch element attached to said internal shaft for axial movement with the latter and having a splined connection with the priming pump, means operatively connected to the internal shaft and acting on the latter to normally disengage the clutch elements, a diaphragm actuator for moving the said internal shaft to engage the elements for actuation of the priming pump, a source of suction, and manually controlled means for operatively connecting said source simultaneously with the diaphragm actuators to open the valve and engage the clutch.

2. In a priming device for centrifugal pumps and in combination with driving means for said pump, a priming pump, means including a valve for connecting the priming pump to the suction of the centrifugal pump for priming the latter and means acting to normally close said valve, a housing attached to the priming pump, a hollow shaft journalled in the housing and gear means for connecting the shaft to the said driving means, a clutch element secured to said shaft, a complementary clutch element having a splined connection with the priming pump for engagement and disengagement with the element first named, a second shaft axially movable within the hollow shaft, a bearing for one end of the second shaft on the complementary clutch element and means for anchoring the said shaft end to the said element for joint axial movements of the shaft and element, a chamber at the opposite end of the housing, a flexible diaphragm mounted in the housing and forming a wall of said chamber, means for attaching the proximate end of the second shaft to the diaphragm, a spring operatively connected with the shaft and acting to normally retain the complementary clutch element disengaged from the other of said elements, a source of suction, manually controlled means for connecting said source to the chamber to actuate the diaphragm to engage the clutch elements, and a diaphragm actuator for said valve connected with the chamber and operative by said suction to open the valve.

3. In a priming device for centrifugal pumps and in combination with driving means for said pump, a priming pump, means for connecting the priming pump to the suction of the centrifugal pump for priming the latter, and means for operatively connecting the priming pump to said driving means, said latter means comprising a housing, a hollow shaft journalled in the housing, a drive gear for said shaft secured to the midsection of the latter, a shaft coaxial with and within said hollow shaft, complementary clutch elements on proximate ends respectively of said shafts, the clutch element of the inner shaft having a splined connection with the priming pump, means in the housing attached to the opposite end of said inner shaft and responsive to fluid pressure to move the shaft axially for engaging the clutch elements, and resilient means for normally retaining the inner shaft in position to disengage the clutch elements.

References Cited in the file of this patent

UNITED STATES PATENTS

| 2,294,454 | Hathaway et al. | Sept. 1, 1942 |
| 2,329,459 | Van Pelt | Sept. 14, 1943 |
| 2,412,839 | Smith | Dec. 17, 1946 |
| 2,464,144 | McConaghy | Mar. 8, 1949 |
| 2,683,420 | Hill et al. | July 13, 1954 |

FOREIGN PATENTS

| 371,138 | Germany | Mar. 14, 1923 |
| 392,042 | Germany | Mar. 15, 1924 |